US008755016B2

(12) United States Patent
Song (10) Patent No.: US 8,755,016 B2
(45) Date of Patent: Jun. 17, 2014

(54) LIQUID CRYSTAL PANEL, TFT ARRAY SUBSTRATE AND MANUFACTURING METHOD THEREOF

(75) Inventor: Sung Hun Song, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 13/290,372

(22) Filed: Nov. 7, 2011

(65) Prior Publication Data

US 2012/0113365 A1 May 10, 2012

(30) Foreign Application Priority Data

Nov. 8, 2010 (CN) .......................... 2010 1 0539374

(51) Int. Cl.
*G02F 1/1339* (2006.01)
*G02F 1/1343* (2006.01)
(52) U.S. Cl.
USPC ............ 349/139; 349/149; 349/153; 349/157
(58) Field of Classification Search
USPC ........... 349/40, 122, 138, 139, 149, 151–153, 349/155, 157, 187, 190; 445/25
See application file for complete search history.

(56) References Cited

U.S. PATENT DOCUMENTS

| 2006/0132697 A1 | 6/2006 | Ueshima |
| 2006/0139553 A1* | 6/2006 | Kang et al. ..................... 349/149 |
| 2007/0279543 A1* | 12/2007 | Park et al. ....................... 349/40 |
| 2009/0073336 A1* | 3/2009 | Peng ............................. 349/40 |
| 2011/0090445 A1* | 4/2011 | Kim et al. .................... 349/139 |
| 2011/0116019 A1* | 5/2011 | Hwang et al. .................. 349/84 |

FOREIGN PATENT DOCUMENTS

| CN | 1782795 A | 6/2006 |
| CN | 101387800 A | 3/2009 |
| KR | 20070002748 A | 1/2007 |
| KR | 20070116510 A | 12/2007 |

OTHER PUBLICATIONS

First Chinese Office Action dated Aug. 5, 2013 Appln. No. 20101053974.2.
Korean Office Action dated Feb. 20, 2013; Appln. No. 10-2011-0114457.
Second Chinese Office Action Dated Feb. 18, 2014; Appln. No. 201010539374.2.

* cited by examiner

*Primary Examiner* — Dung Nguyen
*Assistant Examiner* — Tai Duong
(74) *Attorney, Agent, or Firm* — Ladas & Parry LLP (57) ABSTRACT

Embodiments of the disclosed technology relates to a liquid crystal panel, a TFT (thin film transistor) array substrate and a manufacturing method thereof. The TFT array substrate, comprising: a base substrate; and gate scanning lines, data scanning lines and a protection layer formed on the base substrate, and the protection layer covering the gate scanning lines and the data scanning lines, wherein conductive layers are disposed on the protection layer at locations corresponding to the gate scanning lines and/or the data scanning lines in a region for applying a sealant.

19 Claims, 5 Drawing Sheets

LIQUID CRYSTAL PANEL, TFT ARRAY SUBSTRATE AND MANUFACTURING METHOD THEREOF

BACKGROUND

Embodiments of the disclosed technology relate to a liquid crystal panel, a TFT (thin film transistor) array substrate and a manufacturing method thereof.

A liquid crystal panel mainly comprises a TFT array substrate and a color filter substrate bonded with each other with a liquid crystal layer injected therebetween. A sealant (seal agent) is interposed between the peripheries of the TFT array substrate and the color filter substrate to seal them. The TFT array substrate comprises a plurality of gate scanning lines and a plurality of data scanning lines which are crossed with each other so as to define pixel units. Each of the pixel units is provided with a thin film transistor and a pixel electrode. A common electrode and color resin films corresponding to each pixel unit are provided on the color filter substrate.

A voltage is applied to a gate scanning line so that the source electrode and the drain electrode of the corresponding TFT are electrically communicated. Because the data scanning line is connected with the source electrode of the TFT and the drain electrode of the TFT is connected with the pixel electrode, the pixel voltage on the data scanning line can be applied to the pixel electrode and can be hold. A electrical filed is formed between the pixel electrode on the TFT array substrate and the common electrode on the color filter substrate due to voltage on the pixel electrode so as to control the light transmittance and display an image.

Figure 1:
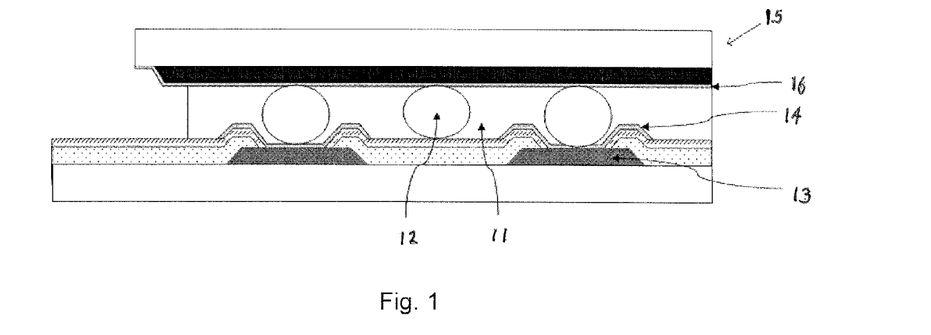
FIG. 1 is a schematic view showing a common electrode being connected via conductive balls in the prior art.

A common electrode for forming a storage capacitor with the pixel electrode is also provided on the TFT array substrate. In order to ensure the potential of the common electrode on the TFT array substrate is the same as that of the common electrode on the color filter substrate, the common electrodes on the TFT array substrate and the color filter substrate should be connected together. A simple process for this in the prior art is shown in FIG. 1. Conductive balls 12 are provided inside the sealant 11, and a through hole is formed in the location corresponding to the common electrode 13 on the TFT substrate in the region for applying the sealant 11. A metal layer 14 is deposited in the through hole so that the common electrode 13 on the TFT substrate is electrically connected with the conductive balls 12 via the metal layer 14, and further electrically connected with the common electrode 16 on the color filter substrate 15.

Figure 2:
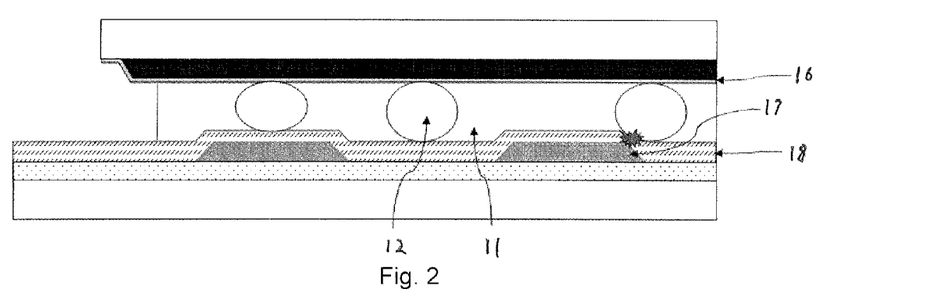
FIG. 2 is a schematic view showing a capacitor forming between a conductive balls and a data scanning line in the prior art.

During performing the above solution, the inventor has found that the prior art have at least the following problems. As shown in FIG. 2, because the conductive balls 12 in the sealant 11 are easy to accumulate static electricity, a electrical filed generates between the conductive balls 12 and the data scanning line 17 on the TFT array substrate and can break down a protection layer 18 on the data scanning line 17, so that a electricity leaking phenomenon of the data scanning lines occurs and the normal displaying function is influenced. In addition, the above problem can also exist on the gate scanning lines.

SUMMARY

One embodiment of the disclosed technology provides a thin film transistor (TFT) array substrate, comprising: a base substrate; and gate scanning lines, data scanning lines and a protection layer formed on the base substrate, and the protection layer covering the gate scanning lines and the data scanning lines, wherein conductive layers are disposed on the protection layer at locations corresponding to the gate scanning lines and/or the data scanning lines in a region for applying a sealant.

Another embodiment of the disclosed technology provides a manufacturing method for a thin film transistor (TFT) array substrate, comprising: forming gate scanning lines, data scanning lines, thin film transistors and a protection layer on a base substrate, the protection layer covering the gate scanning lines, the data scanning lines and the thin film transistors; and forming conductive layers on the protection layer, the locations for forming the conductive layers correspond to the gate scanning lines and/or the data scanning lines in the region for applying a sealant.

Still another embodiment of the disclosed technology provides a liquid crystal panel, comprising a color filter substrate and a thin film transistor (TFT) array substrate, the color filter substrate and the TFT array substrate are sealed with a sealant therebetween, wherein, the TFT array substrate can be the TFT array substrates according to any embodiment of the disclosed technology.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein:

FIG. 5.1 is a schematic plane view showing a TFT array substrate; FIG. 5.2 is an enlarged view of a part of top left corner of FIG. 5.1 and only showing a data scanning line and a sealant, and FIG. 5 is a cross-sectional view corresponding to the location indicated as "A-A'" in FIG. 5.2; FIG. 5.3 is a cross-sectional view showing a part of a liquid crystal panel according to another embodiment of the invention; FIG. 5.4 is an enlarged view of a part of top left corner of FIG. 5.1 and only showing a gate scanning line and the sealant, and FIG. 5.3 is cross-sectional view corresponding to the location indicated as "A-A'" in FIG. 5.4;

DETAILED DESCRIPTION

The disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

First Embodiment

Figure 3:
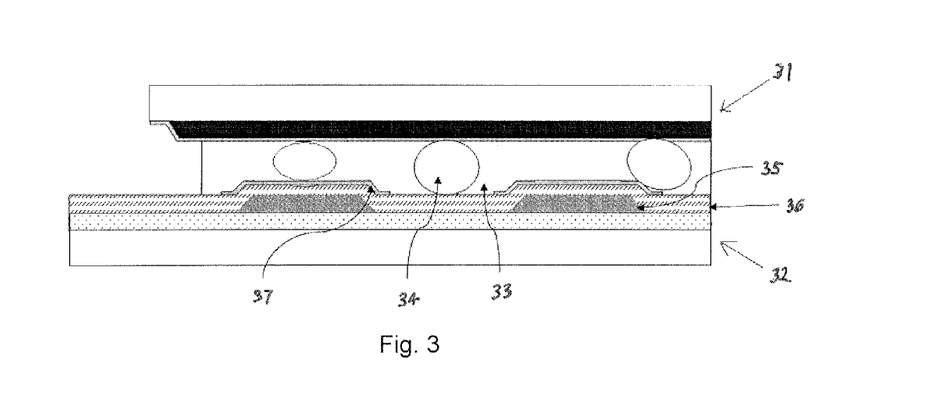
FIG. 3 is a cross-sectional view showing a liquid crystal panel adopting a TFT array substrate according to a first embodiment of the disclosed technology.

The embodiment of the disclosed technology provides a TFT array substrate. The TFT array substrate comprises a base substrate and data scanning lines, gate scanning lines, thin film transistors and a protection layer for the TFT array substrate formed on the base substrate. These structures can be fabricated by any method in the prior art. The protection layer covers structures such as the data scanning lines, the gate scanning lines and the thin film transistors (TFT), as illustrate in FIG. 8. FIG. 3 is a partial cross-sectional view of a liquid crystal panel in the embodiment of the disclosed technology, and the gate canning lines are not shown in FIG. 3.

The embodiment of the disclosed technology will be described by taking FIG. 3 as an example. The liquid crystal panel as shown in FIG. 3 comprises a TFT array substrate 32 and a color filter substrate 31 which are sealed by a sealant 33 therebetween. Specifically, the sealant 33 is interposed between the peripheral regions of the TFT array substrate 31 and the color filter substrate 32 so as to seal the liquid crystal dropped between the TFT array substrate 31 and the color filter substrate 32. The sealant 33 has conductive balls therein. In order to protect the data scanning lines 35 on the TFT array substrate, on the protection layer 36 of the TFT array substrate 32 according to the embodiment of the disclosed technology, conductive layers 37 are disposed at locations corresponding to each of the data scanning lines 35 in the region for applying the sealant 33.

By the embodiment of the disclosed technology, if the conductive layers 37 are contacted with the conductive balls 34 in the sealant 33, the electrical charges accumulated in the conductive balls 34 can be dispersed onto the conductive layers 35, so that the electrical charges will not be accumulated at one point and the electrical field between the conductive balls 34 and the data scanning lines 35 can be reduced. Therefore, the breakdown of the protection layer 36 covering the data scanning lines 35 can be prevented efficiently, which reduces the electricity leaking problem to occur on the data scanning line 35 and ensures the normal displaying of the liquid crystal panel.

Generally, only one layer of passivation layer is used as the protection layer on the data scanning lines, however, two layers including a gate insulating layer and the passivation layer can be used as the protection layer for the gate scanning lines. Therefore, generally, only the data scanning lines are needed to be protected.

Besides the solution in which the conductive layers are disposed at the locations corresponding to each of the data scanning lines, the embodiment of the disclosed technology further provides another solution. In order to protect the gate scanning lines, on the TFT array substrate, conductive layers can be disposed at locations corresponding to each of the gate scanning lines in the region for applying the sealant. Thus, the electrical charges accumulated on the conductive balls can be dispersed onto the conductive layers, so that the charges will not be accumulated to one point, which can reduce the electrical filed between the conductive balls and the gate scanning lines. Therefore, the breakdown of the protection layer covering the gate scanning lines can be prevented efficiently, which reduces the electricity leaking problem to occur on the gate scanning lines and ensures the normal displaying of the liquid crystal panel.

According to the embodiment of the disclosed technology, the conductive layers can be disposed at both the locations corresponding to the gate scanning lines and the locations corresponding to the data scanning lines in the region for applying the sealant, so that both the data scanning lines and the gate scanning lines can be protected simultaneously.

Figure 51:
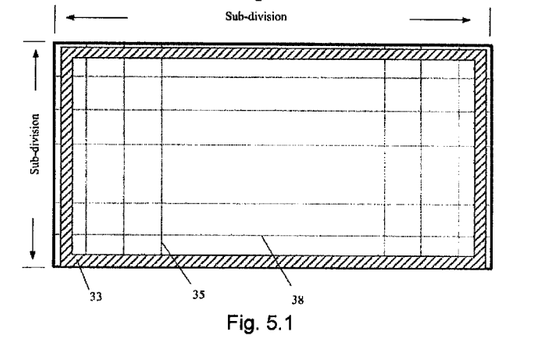
Figure 52:
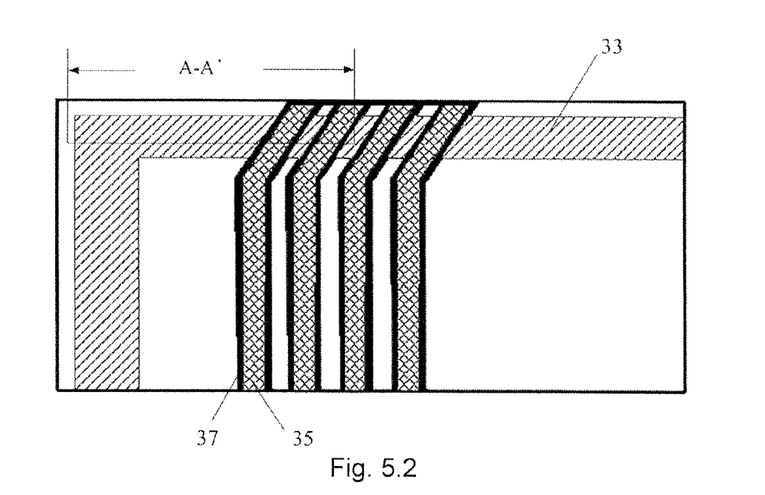
Figure 53:
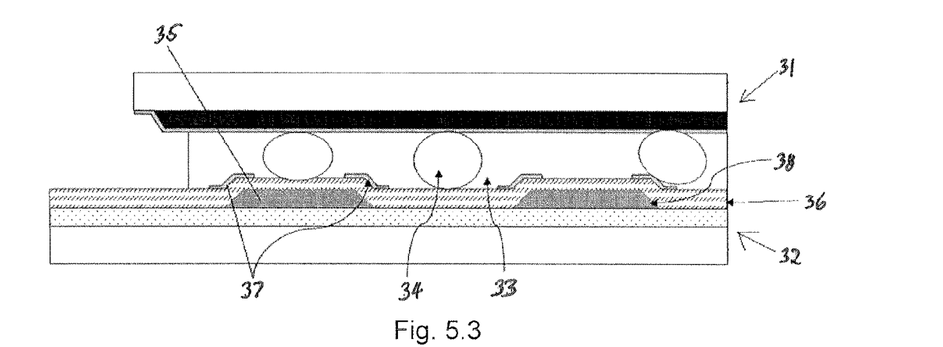
Figure 54:
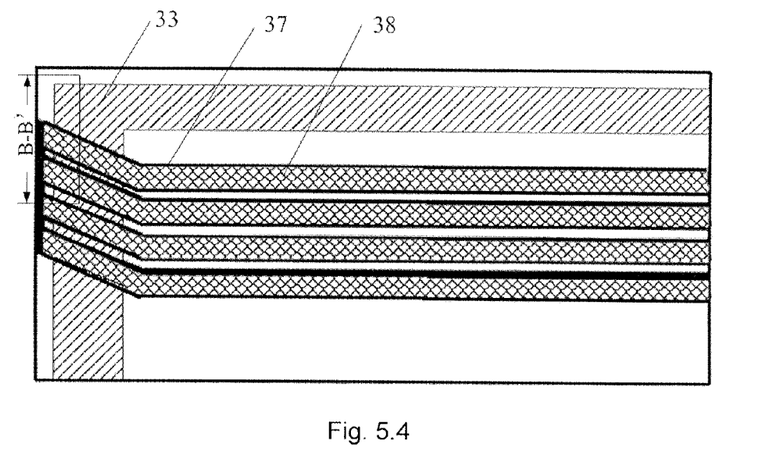

In order to more efficiently prevent the protection layer covering the gate scanning lines and/or the data scanning lines from being broken down, according to the embodiment of the disclosed technology, the conductive layers are extended outside the region for applying the sealant on the TFT array substrate and are grounded, as illustrated in FIGS. 5.1, 5.2 and 5.4. By connecting the part extended outside to be grounded, the charges on the conductive balls can be transported to the ground through the conductive layers, so that the charges will not be accumulated on the conductive balls above the gate scanning lines and/or the data scanning lines so as to efficiently prevent the protection layer covering the gate scanning lines and/or the data scanning lines from being broken down, which reduces the electricity leaking problem to occur on the gate scanning lines and/or the data scanning lines, and ensures the normal displaying of the liquid crystal panel.

In the embodiment of the disclosed technology, the material for forming the conductive layers may be a transparent conductive material but not limited thereto. For example, the conductive layers can be formed of the material the same as that of the pixel electrode. Of course, in the embodiment of the disclosed technology, the conductive layers may be formed of other metal materials because the conductive layers are not located in the effective displaying region of the liquid crystal panel. In addition, the TFT array substrate can comprise a common electrode for forming a storage capacitor with the pixel electrode, and the common electrode on the TFT array substrate is electrically connected with the common electrode on the color filter substrate via the sealant (specifically, via the conductive balls in the sealant).

Figure 7:
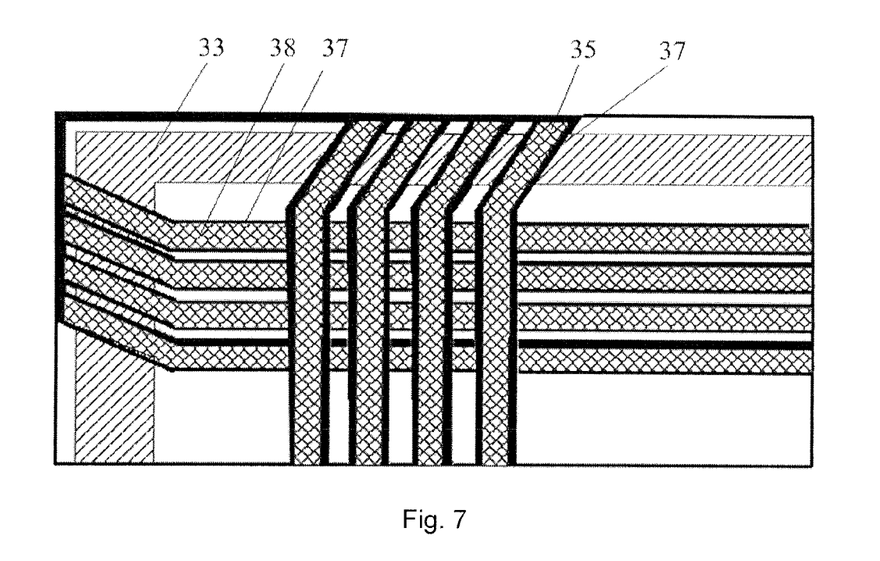
FIG. 7 is an enlarged view of a part of top left corner of FIG. 5.1 and only showing the gate scanning line, the data scanning line and the sealant.

In order to ensure all of the conductive layers in the region for applying the sealant can be grounded, the conductive layers in the region for applying the sealant according to the embodiment of the disclosed technology can be electrically communicated with each other (as illustrated in FIG. 7). Alternately, the region for applying the sealant can be divided into a plurality of sub-divisions (as illustrated in FIG. 5.1), and the conductive layers in each of the sub-divisions are electrically communicated with each other (as illustrated in FIGS. 5.2 and 5.4), which is facilitated for the conductive layers in each sub-division to be grounded. For example, as for a TFT array substrate with a square shape, the four sides of the TFT array substrate can be divided into four sub-divisions each of which comprises the region for applying the sealant in one side (as illustrated in FIG. 5.1).

Figure 4:
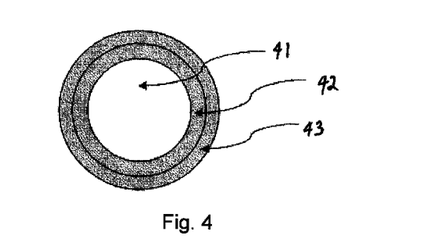
FIG. 4 is a cross-sectional view showing a conductive ball in the first embodiment of the disclosed technology.

Generally speaking, the conductive balls according to the embodiment of the disclosed technology can have a structure in which the inner part is a resin material with elasticity and the outer layer is composed of a first conductive film made of nickel or the like and a secondary conductive film made of gold and the like. As shown in FIG. 4, the inner part of the conductive ball is a resin material 41 with elasticity, and the outer layer is composed of a first conductive film 42 made of nickel or the like and a secondary conductive film 43 made of gold and the like.

Specifically, the conductive layers according to the embodiment of the disclosed technology can be realized by the following methods but not limited thereto.

First, if the conductive layers are disposed at the locations corresponding to the data scanning lines, as shown in FIG. 3, then the conductive layers can be disposed in such a way that they are overlapped with the whole width of the data scanning lines, i.e., the conductive layers cover the whole of each data scanning line in the region for applying the sealant. If the conductive layers are disposed at the locations corresponding to the gate scanning lines, then the conductive layers can be disposed in such a way that they are overlapped with the whole width of the gate scanning lines, i.e., the conductive layers cover the whole of each gate scanning line in the region for applying the sealant.

Figure 5:
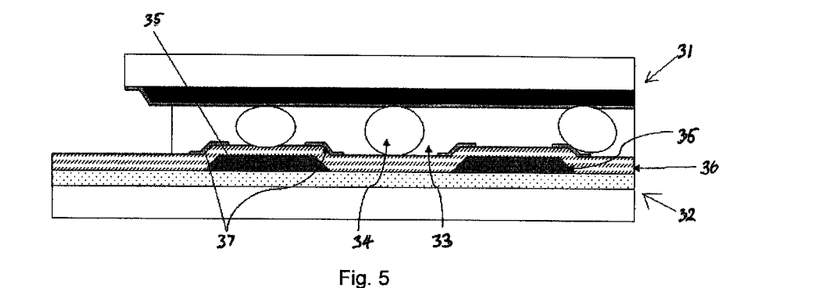
FIG. 5 is a cross-sectional view showing a liquid crystal panel adopting another TFT array substrate according to the first embodiment of the disclosed technology.

Second, if the conductive layers are disposed at the locations corresponding to the data scanning lines, as shown in FIG. 5, then the conductive layers 37 can be disposed in such a way that they are overlapped with the two side edges of each data scanning line, i.e., one conductive layer is disposed at each location corresponding to the two side edges of the data scanning line. The reason for such a configuration is that the breakdown phenomenon easily occurs at the corner at the side edges of the data scanning lines, as shown in FIG. 2. Similarly, if the conductive layers are disposed at the locations corresponding to the gate scanning lines, then the conductive layers can also be disposed in such a way that they are overlapped with the two side edges of each gate scanning line. As shown in FIG. 5.3 and FIG. 5.4, the conductive layers 37 can be disposed in such a way that they are overlapped with the two side edges of each gate scanning line 38, i.e., one conductive layer is disposed at each location corresponding to the two side edges of the gate scanning line 38. Actually, in the peripheral region, the cross-sectional structures corresponding to the location of the data scanning lines and the gate scanning lines are similar to each other. Therefore, the case in which the conductive layers 37 are overlapped with each of the gate scanning lines 38 can also refer to FIG. 3 which illustrates the case of the data scanning lines 35.

Figure 6:
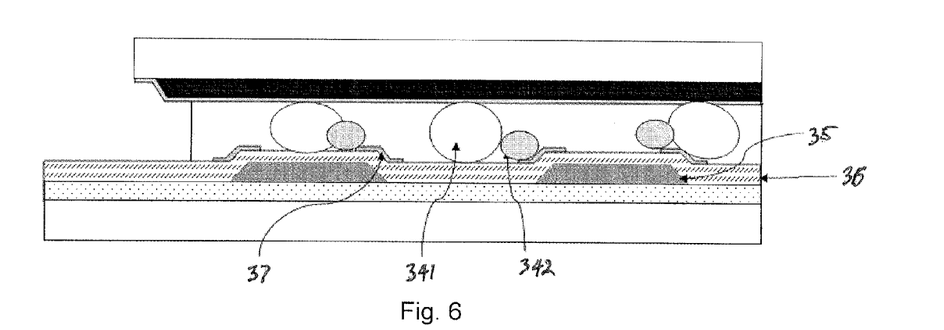
FIG. 6 is a schematic view of a liquid crystal display with a variety of conductive balls in the sealant according to the first embodiment of the disclosed technology.

In order to ensure the effective contact between the conductive balls and the conductive layers, two kinds of conductive balls with different diameters can be disposed in the sealant according to the embodiment of the disclosed technology. As shown in FIG. 6, if there are a kind of conductive balls with larger diameter 341 and a kind of conductive balls with smaller diameter 342 in the sealant, then the conductive balls with smaller diameter 342 can be contacted with the conductive layer effectively, so that the situation of bad contact will be suppressed. As illustrated in FIG. 6, at least two kinds of conductive balls with different diameters are disposed in the sealant, the conductive balls with different diameters contact with each other to form conductive ball groups, and each conductive ball in at least one conductive ball group contact with the conductive layers.

In order to ensure the conductive balls in the sealant to be effectively contacted with the conductive layers, the width of the conductive layers is generally larger than the diameter of the conductive balls according to the embodiment of the disclosed technology.

Second Embodiment

The embodiment of the disclosed technology provides a manufacturing method for a TFT array substrate comprising the following steps.

Step 1, forming gate scanning lines, data scanning lines, thin film transistors and a protection layer on a base substrate. The protection layer covers the gate scanning lines, the data scanning lines, and the thin film transistors. The step can be performed by any known method but not limited thereto, and a specific process will be described later. In addition, the protection layer according to the embodiment of the disclosed technology mainly refers to the passivation layer above the data scanning line.

Step 2, in order to protect the data scanning lines and/or the gate scanning lines, forming a conductive layer on the protection layer according to the embodiment of the disclosed technology, and the locations of the conductive layers correspond to the data scanning lines and/or the gate scanning lines in the region for applying a sealant on the TFT array substrate, as shown in FIGS. 3 and 5.

The conductive layers can be contacted with the conductive balls in the sealant, and the charges accumulated on the conductive balls will be dispersed onto the conductive layers so that the charge will not be accumulated into one point, which can reduce the electrical filed between the conductive balls and the data scanning lines and/or the gate scanning lines. Therefore, the protection layer covering the data scanning lines and/or the gate scanning lines can be prevented from being broken down, which reduces the electricity leaking problem to occur on the gate scanning lines and/or the data scanning lines, and ensures the normal displaying of the liquid crystal panel.

Figure 8:
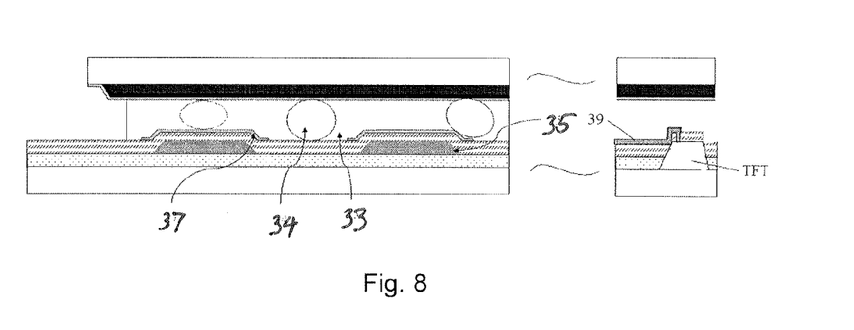
FIG. 8 is a cross-sectional view showing a part in the periphery region and a part in the displaying region of the liquid crystal panel.

According to the embodiment of the disclosed technology, after the protection layer is formed, a pixel electrode 39 can be formed so as to form a capacitor with the common electrode on the color filter substrate and drive the rotation of the liquid crystal material. The material used for the pixel electrode 39 can be a transparent conductive material such as ITO, IZO and the like. In order to simply the procedure, the process for forming the conductive layers 37 in the Step 2 according to the embodiment of the invention and the process for forming the pixel electrode 39 can be performed in the same mask process, as illustrated in FIG. 8. Thus, the material for the conductive layers according to the embodiment of the disclosed technology generally uses a material the same as that for the pixel electrode, i.e. the transparent conductive material.

In order to further reduce electrical field between the conductive balls and the data scanning lines and/or the gate scanning lines, in the Step 2 for forming the conductive layers according to the embodiment of the disclosed technology, the conductive layers are extended outside the region for applying the sealant on the TFT array substrate and are grounded. The charges on the conductive balls can be transported to the ground through the conductive layers, so that the charges will not be accumulated on the conductive balls above the gate scanning lines and/or the data scanning lines so as to efficiently prevent the protection layer covering the gate scanning lines and/or the data scanning lines from being broken down, which reduces the electricity leaking problem to occur on the gate scanning lines and/or the data scanning lines, and ensures the normal displaying of the liquid crystal panel.

In order to ensure all of the conductive layers in the region for applying the sealant can be grounded, all of the conductive layers in the region for applying the sealant according to the embodiment of the disclosed technology can be electrically communicated with each other. Alternately, the region for applying the sealant can be divided into a plurality of subdivisions, and the conductive layers in each of the sub-divisions are electrically communicated with each other, which is facilitated for the conductive layers in each sub-division to be grounded. For example, as for a TFT array substrate with a square shape, the four sides of the TFT array substrate can be divided into four sub-divisions each of which comprises the region for applying the sealant in one side.

Specifically, the conductive layers according to the embodiment of the disclosed technology can be realized by the following methods but not limited thereto.

First, if the conductive layers are disposed at the locations corresponding to the data scanning lines, as shown in FIG. 3, then the conductive layers can be disposed in such a way that they are overlapped with the whole width of the data scanning lines, i.e., the conductive layers cover the whole of each data scanning line in the region for applying the sealant. If the conductive layers are disposed at the locations corresponding to the gate scanning lines, then the conductive layers can be disposed in such a way that they are overlapped with the whole width of the gate scanning lines, i.e., the conductive layers cover the whole of each gate scanning line in the region for applying the sealant.

Second, if the conductive layers are disposed at the locations corresponding to the data scanning lines, as shown in FIG. 5, then the conductive layers 37 can be disposed in such a way that they are overlapped with the two side edges of the data scanning lines, i.e., one conductive layer is disposed at each location corresponding to the two side edges of the data scanning lines. The reason for such a configuration is that the breakdown phenomenon easily occurs at the corner at the side edges of the data scanning lines, as shown in FIG. 2. Similarly, if the conductive layers are disposed at the locations corresponding to the gate scanning lines, then the conductive layers can also be disposed in such a way that they are overlapped with the two side edges of the gate scanning lines.

The method for forming the gate scanning lines, the data scanning lines, the thin film transistors, and the protection layer on the TFT array substrate in Step 1 according to the embodiment of the disclosed technology may be performed as follows but not limited thereto.

Step 11, forming a gate pattern on the base substrate, and the gate pattern including gate scanning lines and gate electrodes connected with the gate scanning lines. The gate pattern is generally formed of metal material such as aluminum, molybdenum, copper or the like, or an alloy of two or more of above metal materials.

Step 12, forming a gate insulating film on the base substrate with the gate pattern. The material for the gate insulating film is generally nitride silicon ($SiN_x$).

Step 13, forming an active film pattern on the gate insulating film so as to be overlapped with the above gate electrodes, the active film pattern comprises a doped semiconductor layer and a semiconductor layer in this order, and a channel region is formed in the active film pattern.

Step 14, forming a source/drain metal film on the base substrate with the active film pattern, and etching the source/drain metal film into a source/drain pattern which includes data scanning lines crossed with the gate scanning lines, the source and drain electrodes of the thin film transistors, wherein the source and drain electrodes are overlapped with the active film pattern.

Step 15, forming a passivation layer above the source/drain pattern, and etching a through hole in the passivation layer above the drain electrode so as to expose the drain electrode.

Step 16, forming a pixel electrode on the passivation layer, and the pixel electrode is connected with the drain electrode of the thin film transistor via the through hole. The material for the pixel electrode according to the embodiment of the disclosed technology is a transparent conductive layer such as ITO, IZO and the like. In practice, forming the conductive layers in the Step 2 according to the embodiment of the disclosed technology can be performed in the same mask process for forming the pixel electrode.

Third Embodiment

The embodiment of the disclosed technology also provides a liquid crystal panel comprising a color filter substrate and a TFT array substrate which are sealed with a sealant therebetween; and the liquid crystal employs the TFT array substrate according to the first embodiment of the disclosed technology.

When manufacturing the liquid crystal panel according to the embodiment of the disclosed technology, besides forming the TFT array substrate according to the second embodiment, it is needed to manufacture the color filter substrate, and then the color filter substrate and the TFT array substrate are bonded and sealed with the sealant.

The embodiment of the disclosed technology are mainly applied in various liquid crystal panels, for example, the liquid crystal panels in various electronic equipments such as a notebook computer, a liquid crystal TV set or the liquid crystal monitor.

It should be noted that: the above embodiments only have a purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. A thin film transistor (TFT) array substrate, comprising:
   a base substrate; and
   gate scanning lines, data scanning lines and a protection layer formed on the base substrate, and the protection layer covering the gate scanning lines and the data scanning lines,
   wherein conductive layers are disposed on the protection layer at locations corresponding to the gate scanning lines and/or the data scanning lines in a region for applying a sealant,
   wherein at least two kinds of conductive balls with different diameters are disposed in the sealant, the conductive balls with different diameters contact with each other to form conductive ball groups, and each conductive ball in at least one conductive ball group contact with the conductive layers.

2. The TFT array substrate of claim 1, wherein the conductive layers are extended into outside of the region for applying the sealant on the TFT array substrate, and are grounded.

3. The TFT array substrate of claim 1, wherein the material for forming the conductive layers comprises a transparent conductive layer.

4. The TFT array substrate of claim 3, further comprising pixel electrodes disposed on the protection layer, and the conductive layers are formed of the same material as that of the pixel electrodes.

5. The TFT array substrate of claim 1, wherein the conductive layers in the region for applying the sealant are electrically communicated with each other; or the region for applying the sealant is divided into at least two sub-divisions, and the conductive layers in each of the sub-divisions are electrically communicated with each other.

6. The TFT array substrate of claim 2, wherein the conductive layers in the region for applying the sealant are electrically communicated with each other; or
the region for applying the sealant is divided into at least two sub-divisions, and the conductive layers in each of the sub-divisions are electrically communicated with each other.

7. The TFT array substrate of claim 3, wherein the conductive layers in the region for applying the sealant are electrically communicated with each other; or
the region for applying the sealant is divided into at least two sub-divisions, and the conductive layers in each of the sub-divisions are electrically communicated with each other.

8. The TFT array substrate of claim 1, wherein conductive balls are disposed in the sealant, and the width of the conductive layers are larger than the diameter of the conductive balls.

9. The TFT array substrate of claim 2, wherein conductive balls are disposed in the sealant, and the width of the conductive layers are larger than the diameter of the conductive balls.

10. The TFT array substrate of claim 3, wherein conductive balls are disposed in the sealant, and the width of the conductive layers are larger than the diameter of the conductive balls.

11. The TFT array substrate of claim 1, wherein the conductive layers are overlapped with the gate scanning lines and/or the data scanning lines; or
the conductive layers are overlapped with the two side edges of the gate scanning lines and/or the data scanning lines.

12. The TFT array substrate of claim 4, further comprising a common electrode for forming a storage electrode with each of the pixel electrodes.

13. A liquid crystal panel, comprising
a color filter substrate, and
the thin film transistor (TFT) array substrate according to claim 1,
wherein the color filter substrate and the TFT array substrate are sealed with a sealant therebetween.

14. The liquid crystal panel of claim 13, wherein, the TFT array substrate further comprises pixel electrodes disposed on the protection layer and a common electrode for forming a storage electrode with each of the pixel electrodes, the color filter substrate comprises a common electrode, conductive balls are disposed in the sealant, and the common electrode of the array substrate is electrically connected with the common electrode of the color filter substrate through the conductive balls in the sealant.

15. A manufacturing method for a thin film transistor (TFT) array substrate, comprising:
forming gate scanning lines, data scanning lines, thin film transistors and a protection layer on a base substrate, the protection layer covering the gate scanning lines, the data scanning lines and the thin film transistors; and
forming conductive layers on the protection layer, the locations for forming the conductive layers correspond to the gate scanning lines and/or the data scanning lines in the region for applying a sealant,
wherein at least two kinds of conductive balls with different diameters are disposed in the sealant, the conductive balls with different diameters contact with each other to form conductive ball groups, and each conductive ball in at least one conductive ball group contact with the conductive layers.

16. The manufacturing method for the TFT array substrate of claim 15, wherein the conductive layers are extended into outside of the region for applying the sealant on the TFT array substrate, and are grounded.

17. The manufacturing method for the TFT array substrate of claim 15, wherein
during the process for forming the conductive layers, the formed conductive layers are overlapped with each of the gate scanning lines and/or each of the data scanning lines; or
during the process for forming the conductive layer, the formed conductive layers are overlapped with two side edges of each of the gate scanning lines and/or each of the data scanning lines.

18. The manufacturing method for the TFT array substrate of claim 15, wherein
all of the conductive layers in the region for applying the sealant are electrically communicated with each other; or
the region for applying the sealant is divided into at least two sub-divisions, and the conductive layers in each of the sub-divisions are electrically communicated with each other.

19. The manufacturing method for the TFT array substrate of claim 15, further comprising forming a pixel electrode on the protection layer, and the conductive layer is formed with the same mask as that of the pixel electrode.

* * * * *